May 24, 1966  G. CHIEGER ETAL  3,252,714
DOLLY FOR TRACTOR-TRAILERS
Filed July 22, 1964  2 Sheets-Sheet 1
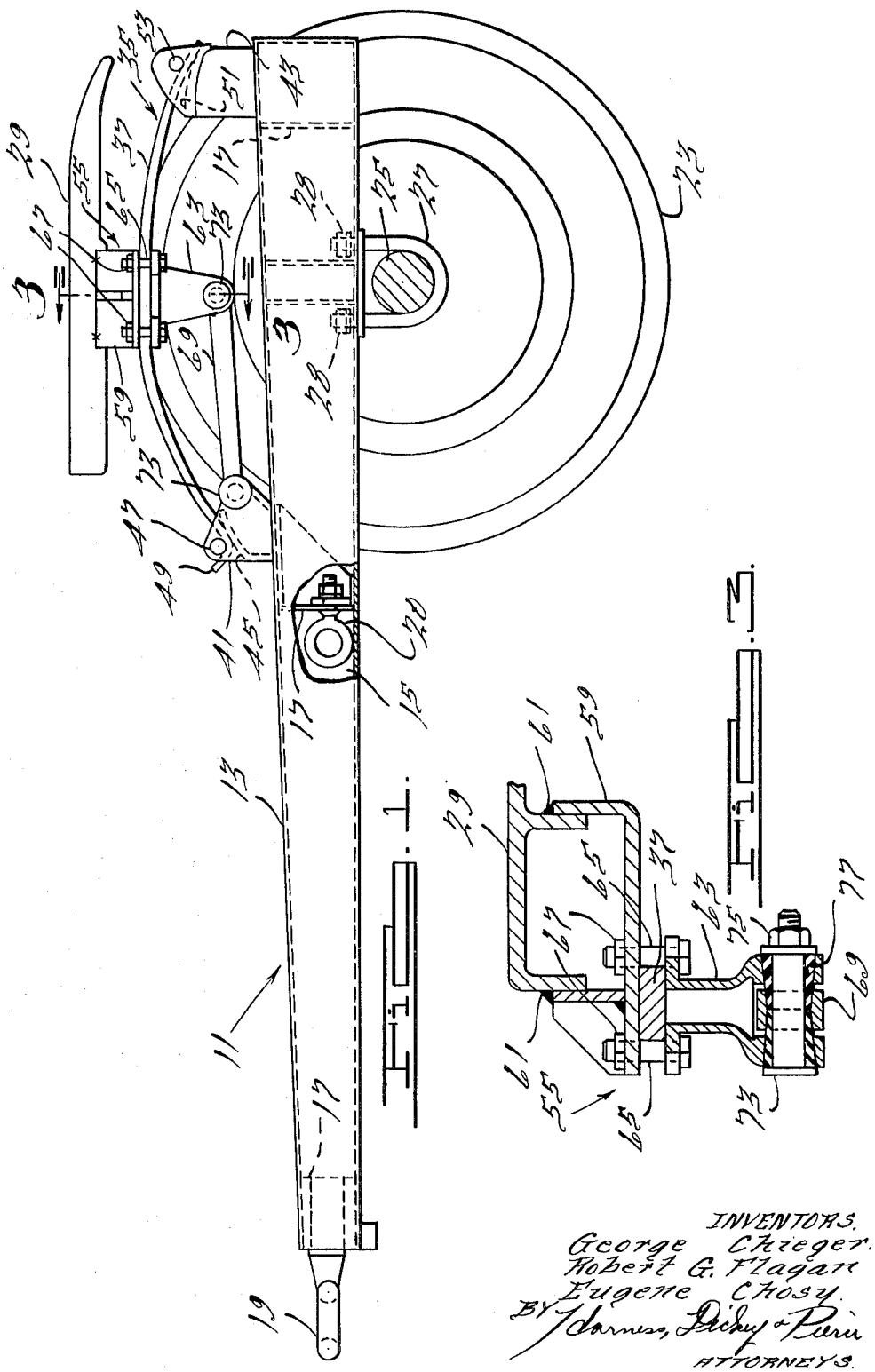
INVENTORS.
George Chieger
Robert G. Flagan
Eugene Chosy
BY Barnes, Kisey & Pierce
ATTORNEYS.

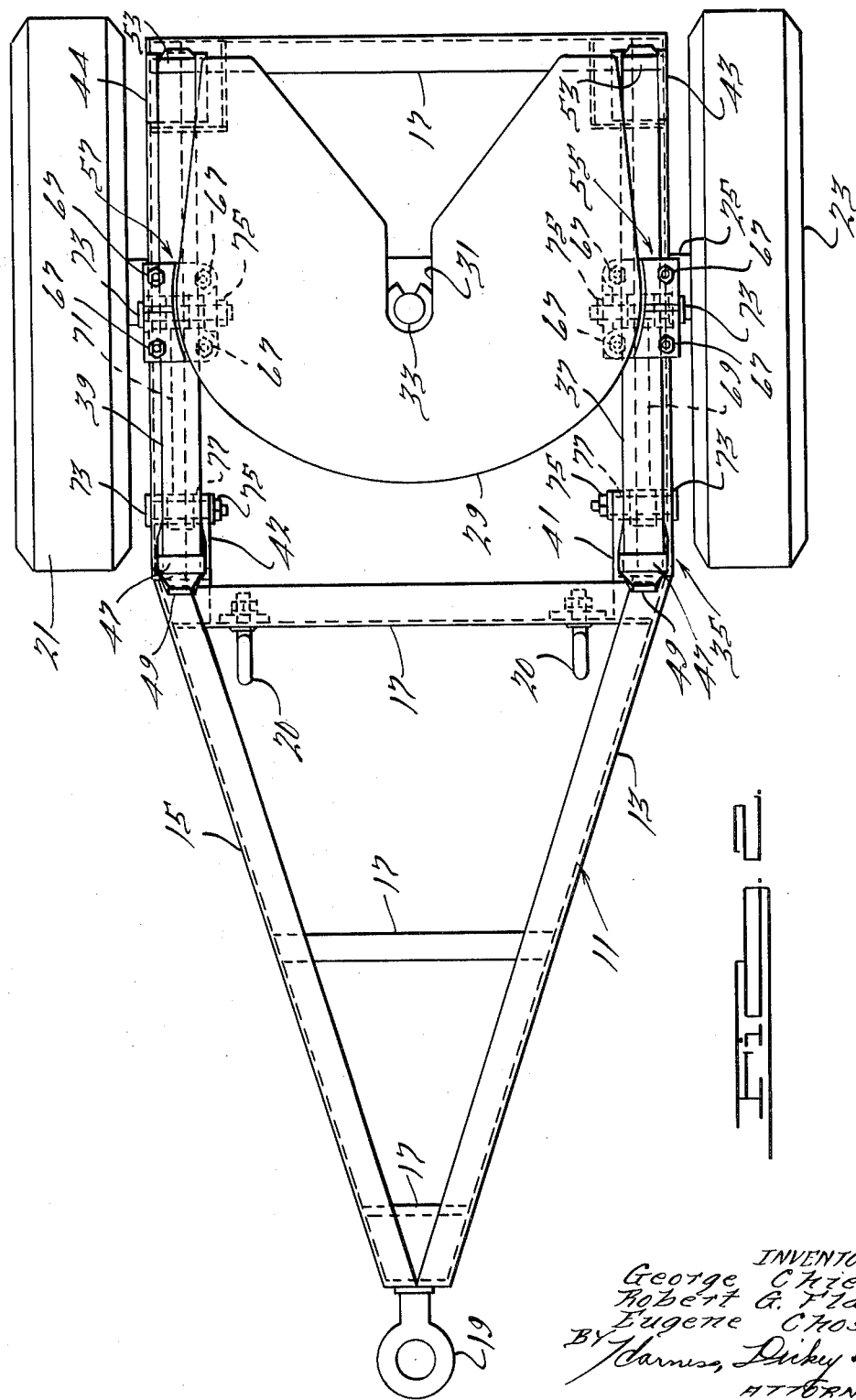

United States Patent Office 3,252,714
Patented May 24, 1966

3,252,714
DOLLY FOR TRACTOR-TRAILERS
George Chieger, Birmingham, Robert G. Flagan, Grosse Pointe Park, and Eugene Chosy, Grosse Pointe Farms, Mich., assignors to Fruehauf Corporation, Detroit, Mich., a corporation of Michigan
Filed July 22, 1964, Ser. No. 384,427
4 Claims. (Cl. 280—418)

The present invention relates to vehicle couplings, and particularly to a device adapted to couple a trailer vehicle such as a semi-trailer to a tractive power vehicle.

The present invention relates to a device for transmitting the tractive effort from a powered vehicle, hereinafter referred to as the tractor, to an articulated vehicle, hereinafter referred to as the trailer. This device is designed to permit relative pivotal or rocking movement about a transverse axis between the tractor and trailer. Furthermore, the device tends to maintain the coupling device relatively stable in a predetermined orientation without the need for costly journal connections.

This invention will be particularly advantageous for use in conjunction with a dolly used to connect small tractors to trailers for moving the trailers around a trailer yard. However, the principles of the present invention are not to be limited to use in a dolly but may be extended to any couplings for transmitting tractive effort to a trailer vehicle. For example, the principles of this invention are readily adaptable for use in the fifth wheel coupling between a large highway tractor truck and a semitrailer.

Briefly, this invention includes a frame supported upon suitably spaced wheels and adapted for connection at one end to a tractor. The frame in turn supports a fifth wheel plate, in which a trailer king pin is received, through a spaced pair of longitudinally extending leaf springs which permit pivotal and rocking movement of the plate relative to the frame. A pivotal radius rod assembly connects the frame to the fifth wheel plate to transmit tractive effort directly from the tractor to the fifth wheel plate and thence to the trailer king pin.

The dolly construction of the present invention is therefore designed to resiliently maintain both longitudinal and lateral stability between the tractor and trailer while effectively transmitting tractive effort to the trailer through a relatively simple but durable connection.

Accordingly, an object of the present invention is to provide a coupling device for a trailer dolly or the like adapted to effectively transmit tractive effort from a tractor to a trailer while maintaining relative longitudinal and transverse stability therebetween.

A further object of the present invention is to provide an improved coupling device for a trailer dolly or the like of the above character wherein the tractive effort is transmitted from tractor to trailer to the exclusion of the pivotal and rocking connection.

A further object of the present invention is to provide an improved coupling device for a trailer dolly or the like of the above character which permits relative pivotal and rocking movement between the tractor and trailer without the need for any journaled connection.

A further object of the present invention is to provide an improved coupling device for a trailer dolly or the like of the above character wherein the dolly is maintained relatively stable against rotation about its ground contacting wheels.

A further object of the present invention is to provide an improved coupling device of the above character which permits relative pivotal movement between the tractor and trailer.

A still further object of the present invention is to provide an improved coupling device of the above character adapted for use in a variety of tractor-trailer connections.

A still further object of the present invention is to provide an improved coupling device of the above character which is relatively inexpensive to manufacture, rugged in construction and reliable in operation.

Further objects and advantages of the present invention will become more apparent from the following detailed description taken in conjunction with the drawings in which:

FIGURE 1 is an elevational view of a dolly provided with a coupling device constructed according to the principles of the present invention;

FIG. 2 is a top plan view of the structure of FIG. 1; and

FIG. 3 is a sectional view of a portion of the structure of FIG. 1 taken along the line 3—3 thereof.

Referring now more specifically to the drawings, a trailer dolly designed for use with the device of the present invention is seen to include a frame 11 which may have a pair of side rails 13 and 15 forming a generally A-shaped configuration reinforced by generally transversely extending ribs 17. One end of the frame 11 may be provided with a suitable eye 19 adapted for connection to a suitable tractor (not shown) in the usual manner. An additional pair of eyes 20 may be suitably attached to the frame 11 through a rib 17 for receiving a safety cable (not shown) in the usual manner. The other end of the frame is adapted to be supported in the usual manner by means of a set of spaced-apart wheels 21 and 23 disposed upon a transverse axle 25. As shown, the frame 11 may be fixed to the axle 25 as by U-bolts 27 fixed to the rails 13 and 15, respectively, by nuts 28.

A fifth wheel plate 29 is provided with a notch 31 adapted to receive a king pin 33 of a semitrailer unit (not shown) and is resiliently supported upon the frame 11 by a leaf spring assembly indicated generally at 35. This spring assembly is seen to include a pair of spaced parallel single leaf springs 37 and 39 supported at one end by a pair of front brackets 41 and 42 and at their other ends by a pair of rear brackets 43 and 44, respectively. As shown, the front brackets 41 and 42 may be formed identically and each includes an arcuate ramp 45 and an opposed spaced roller 47. An end portion of each of the springs 37 and 39 is adapted to be received between the ramp 45 and roller 47 of the respective brackets 41 and 42 and each spring 37 and 39 is arcuately formed at this end portion as at 49 to partially surround the rollers 47 to prevent the springs from pulling out of the brackets 41 and 42.

The rear brackets 43 and 44 are also identically formed and may include an arcuate ramp 51 and a spaced roller 53 between which the other end portion of the springs 37 and 39 is received. The rollers 47 and 53 may be constructed from suitable material such as rubber to facilitate easy insertion of the springs.

The leaf springs 37 and 39 are formed in a manner to normally assume an arcuate configuration having a relatively small radius. Thus, these springs will be stretched to a relatively large radius when positioned in the brackets 41, 42 and 43, 44 with the spring therefor exerting a constant force against the arcuate ramps 45 and 51. The springs will therefore require no further clamping means to retain them in position on these brackets.

The fifth wheel plate 29 is preferably fixed to the springs 37 and 39 intermediate their end portions by fifth wheel plate bracket assemblies indicated generally at 55 and 57, respectively. Since these bracket assemblies are identical, a description of one will suffice here. As shown in FIG. 3, the plate bracket assembly 55 includes an upper bracket portion 59 secured to the fifth wheel plate by suitable means such as welds 61. This upper bracket portion is disposed in confronting relation to the upper edge of the spring 37 and is adapted to be connected to a lower bracket portion 63 by suitable means such as bolts 65 and nuts 67. These bolts and nuts also serve to rigidly clamp the upper and lower plate bracket portions 59 and 63 to the leaf spring 37. In use, the fifth wheel plate 29 will be permitted to rock and pivot relative to the frame 11 in both a longitudinal and transverse direction through the resilient action of the spring assemblies 35, the extent of such movement being a function of the spring design and stiffness. Preferably, these springs will permit adequate relative movement between the fifth wheel plate 29 and frame 11 as required by the tractor and trailer, but will normally maintain both longitudinal and transverse stability therebetween.

The tractive effort imparted to the frame 11 by the tractor (not shown) to the dolly frame 11 is designed to be transmitted to the fifth wheel plate 29 and thence to the trailer (not shown) to the exclusion of the springs 37 and 39. To accomplish this end, a pair of radius rods 69 and 71 are pivotally attached at one end to a respective one of the front brackets 41 and 42 as by a suitable bolt 73 and nut 75. A conventional pair of rubber grommets 77 may surround each of the bolts 73 and be between the bolts 73 and their respective radius rods 69 and 71 to absorb shock therebetween. Similarly, the other ends of the radius rods 69 and 71 are pivotally connected to the lower bracket portions 63 of the plate bracket assemblies by identical bolts 73, nuts 75 and grommets 77.

In use, the tractive effort, including both push and pull, imparted to the frame 11 by the tractor (not shown) will be transmitted to the fifth wheel plate 29 and thence to the trailer solely by the radius rods 69 and 71. No tensional or compressive forces will be seen to stress the springs 37 and 39 during use since the bracket devices 41 and 43 which support these springs will permit sufficient longitudinal movement thereof relative to the frame 11. This will have the effect of materially increasing the spring life. Additionally, since the tractive effort of the tractor is transmitted through the coupling independent of the springs 37 and 39, the resiliency afforded by these springs will be consistent and will also be independent of the fifth wheel plate 29 orientation.

In functioning this way, the dolly coupling provided hereinabove eliminates the need for a journaled connection between the fifth wheel plate and dolly frame generally required in fifth wheel assemblies. The springs 37 and 39 permit the needed relative rocking and pivotal movement between the fifth wheel plate and the frame needed in rough pavement locations while the rods 69 and 71 transmit the tractive force therebetween. By making these two joints separate, applicants have eliminated the need for using a costly journal bearing and therefore have reduced the manufacturing cost of the coupling.

While a preferred embodiment of the present invention has been illustrated and described in detail, various additions, substitutions, modifications and omissions may be made thereto without departing from the spirit of the invention as encompassed by the appended claims.

What is claimed is:

1. A dolly coupling comprising a frame adapted to be connected to a tractor and having a pair of spaced apart ground engaging wheels, a fifth wheel plate adapted for connection to a trailer, means resiliently supporting said fifth wheel plate on said frame and for transmitting tractive effect from said tractor to said fifth wheel plate, said means including an upper bracket portion secured to said fifth wheel plate, a lower bracket portion secured to said upper bracket portion, a leaf spring having a midportion between and secured to said upper and lower bracket portions and end portions supported upon said frame for limited longitudinal movement relative thereto, said spring being stressed relative to its normal configuration when supported upon said frame to hold said spring end portions in place upon said frame, and elongated means pivotally connected to said frame and said lower bracket portion for transmitting tractive effort from said tractor to said trailer independently of said spring.

2. A dolly coupling of the character defined in claim 1, wherein said pivotal connections between said elongated means and said frame and lower bracket portion includes shock absorbing means associated therewith to cushion shock forces transmitted between said frame and lower bracket portion.

3. A dolly coupling of the character defined in claim 1, wherein said resiliently supporting and tractive effort transmitting means includes a pair of laterally spaced generally parallel leaf springs and a corresponding pair of upper and lower bracket portions and elongated means.

4. A dolly coupling of the character defined in claim 1, wherein said leaf spring has one end portion provided with a reversely curved extremity partially surrounding a first roller fixed to said frame and held in engagement therewith by a first seat on said frame, and another end portion having a straight extremity positioned between a second roller and seat on said frame.

References Cited by the Examiner

UNITED STATES PATENTS

| | | | |
|---|---|---|---|
| 1,267,561 | 5/1918 | Lapham | 280—439 |
| 2,254,532 | 9/1941 | Knox | 280—418 |
| 2,733,931 | 2/1956 | Reid et al. | |
| 3,020,065 | 2/1962 | Sandefur | 280—439 |

LEO FRIAGLIA, *Primary Examiner.*